Figure 1:
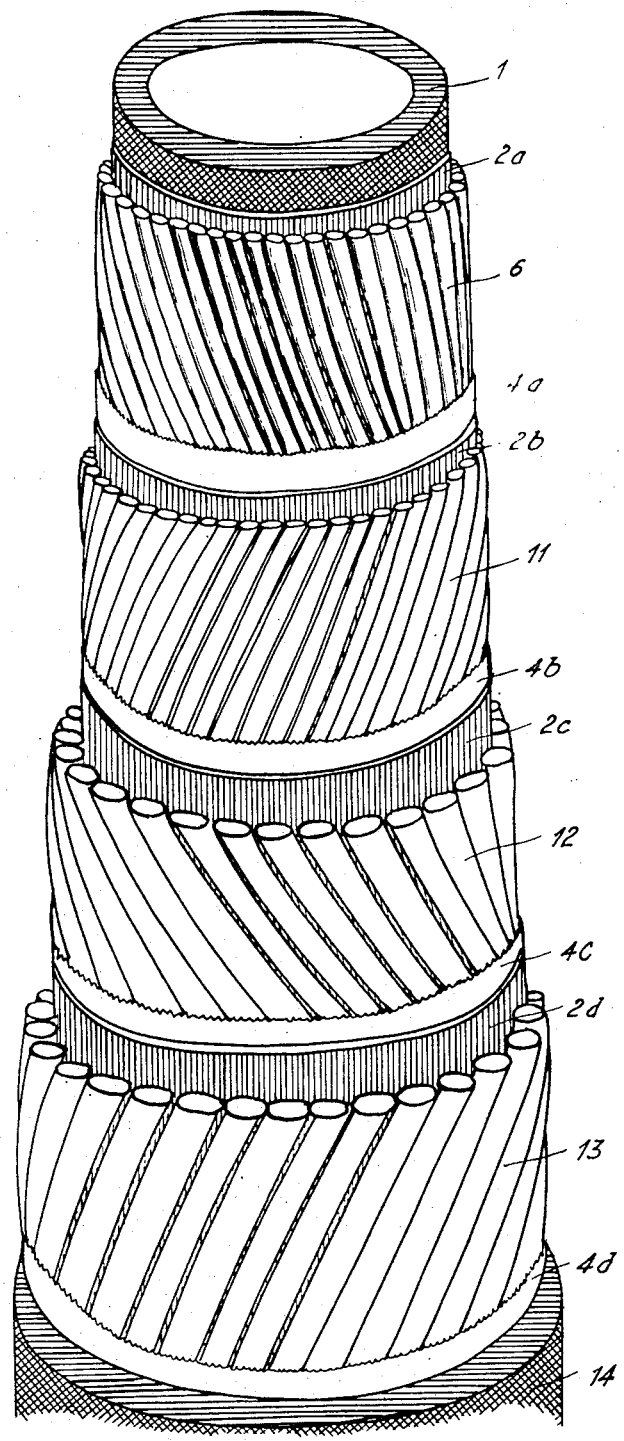

United States Patent [19]
Remi

[11] 3,791,898
[45] Feb. 12, 1974

[54] WINDABLE FLEXIBLE SHAFT CAPABLE OF WITHSTANDING HIGH TRACTIVE FORCES AND TORSIONAL STRESSES AND PROCESS FOR MANUFACTURING THE SAME

[75] Inventor: Reynard Remi, Montesson, France

[73] Assignee: Institut Francius Du Petrole Des Carburants Et Lubrifiants, (Hauts de Seine), Rueil-Malmaison, France

[22] Filed: Oct. 6, 1970

[21] Appl. No.: 78,592

Related U.S. Application Data

[62] Division of Ser. No. 725,426, April 30, 1968, Pat. No. 3,559,693.

[30] Foreign Application Priority Data
May 5, 1967   France ............................ 67.105469

[52] U.S. Cl. .................... 156/143, 64/2 R, 156/86, 156/149, 156/188
[51] Int. Cl. ......................... B31c 13/00, B29h 7/14
[58] Field of Search . 156/143, 86, 188, 149; 64/2 R

[56] References Cited
UNITED STATES PATENTS
3,138,511   6/1964   Cadwallader .................. 156/143 X
3,296,047   1/1967   Parr ................................. 156/143 X
2,573,361   5/1972   Rodgers et al. ....................... 64/2 R
3,234,723   2/1966   Brown .................................. 64/2 R
3,063,303   11/1962   Cadwallader ......................... 64/2 R FOREIGN PATENTS OR APPLICATIONS
437,396   10/1935   Great Britain ..................... 156/143

Primary Examiner—Clifton B. Cosby
Attorney, Agent, or Firm—Craig, Antonelli, Stewart and Hill

[57] ABSTRACT

A process for manufacturing a flexible shaft including a flexible core surrounded with at least one armoring constituted of at least two layers of helically wound metallic wires or cables. This process is characterized in that each armoring layer is provided with an anchoring layer wherein it is embedded, thin anchoring layer being constituted of an elastomeric or thermoplastic material which has been subjected to a thermal treatment, in combination with a thin hooping and separating layer which covers the armoring layer and is constituted of a material which can withstand the thermal treatment without flowing, thin material preferably retracting under the conditions of this thermal treatment.

11 Claims, 5 Drawing Figures

WINDABLE FLEXIBLE SHAFT CAPABLE OF WITHSTANDING HIGH TRACTIVE FORCES AND TORSIONAL STRESSES AND PROCESS FOR MANUFACTURING THE SAME

This is a division of application Ser. No. 725,426, filed April 30, 1968 now U.S. Pat. No. 3,559,693. The present invention relates to a windable flexible shaft capable of withstanding stresses resulting from high tractive forces and high torques and which can be wound up no as in particular to be stored, which means in practice that its flexibility is sufficient to allow a radius of curvature R of this shaft, the value of which is smaller than or at most equal to $a,d$, $d$ being the shaft diameter measured with the same unit as R and a being a numerical coefficient the value of which does not exceed a few units, 4 to 5 for example.

A windable flexible shaft according to the invention may either be tubular or have a solid section, like a cable, A tubular flexible shaft according to the invention may in particular be used in the drilling devices in which the drill bit is surmounted by a bottom motor which it directly coupled to the drill bit and connected with the surface through a flexible pipe.

Flexible pipes capable of supporting high tractive forces have already been proposed, in particular in French patent specification No. 1249236 filed on Nov. 27th 1958.

These pipes include at least two steel wires or cables disposed along a direction parallel to the pipe axis in one and the same plane containing this axis, these wires or cables being for example embedded in the core of elastomeric or thermoplastic material constituting the pipe.

Such a pipe presents however the drawback of being foldable only in a single plane which is perpendicular to the plane containing the wires or cables of resistance to the longitudinal tractive forces.

Other structures of flexible pipes, capable of withstanding high tractive forces and longitudinal stresses to which may be sometimes added important differences between the internal and the external pressures of the pipe have been described.

These pipes include at least one armoring made of at least two reinforcement layers of wires or cables, such as metallic strands, flat cables made of braided wires which are helically wound around the tube core.

A first problem which arises then is that of preventing the adjacent convolutions of the wires or cables constituting the armoring layer to slide one under the other and overlap one another during the manufacturing of the pipe when the latter is bent, for example during the winding of this pipe on a drum, this bending of the wires or cables resulting, as it appears when considering an element of small length of the pipe, in a compression of that part of the element nearest the center of curvature of the pipe and in a lengthening of the part of this element most remote from this center.

The overlapping of adjacent convolutions may cause the pipe to burst under the action of an internal pressure, at the places of the pipe which are no longer covered by the convolutions of wires or cables and reduces the flexibility of the pipe and its mechanical resistance since the overlapping wires or cables shear one another.

It is not possible to solve this problem by using armoring which are each formed of only one metallic braid or wire netting since the flexible shaft must withstand torsional stresses.

As a matter of fact such armorings would be rapidly sheared by the torsional stresses as a result of the mutual friction of the wires or cables constituting these armorings.

Moreover even for relatively small torsional stresses, compatible with the resistance of an armoring constituted of a metallic wire netting (torques which do not exceed a few kilograms $x$ meters for example, i.e hundred times smaller than that which must be resisted to in the above-mentioned application to earth drilling), it is not possible to use armorings of metallic netting if the flexible shaft includes electric conductors, since with armorings of this kind a torque, even of a small magnitude, applied to the flexible shaft would result in an important twisting or torsional angle of this shaft, which could lead to the breaking of the electric conductors embedded in the shaft.

A second problem is that of providing the possibility of a relative sliding of the successive reinforcement or armoring layers on each other so as to allow each layer to exactly adapt itself to the stresses (due to traction, twist and compression) applied to the pipe.

It is therefore impossible to solve the first of the abovementioned problems by embedding the different armoring layers in one and the same layer of elastomer the vulcanizing of which would have the drawback of making all these different layers integral with one other.

Both these problems are simultaneously solved according to the invention with a structure for a flexible shaft including a flexible core surrounded with at least one armoring formed of at least two layers of helically wound metallic wires or cables, wherein each armoring layer is associated with at least one anchoring layer in which said armoring layer is embedded and which is constituted of an elastomeric or thermoplastic material which has been subjected to a thermal treatment at a temperature between about 100°C and 300°C, most of time 125°and 175°C, and pressures ranging from about 1 kg/cm², to about 20 kg/cm² and most of time between 3 and 6 kg/cm², in combination with a thin hooping and separating layer, covering said armoring layer and formed of a material capable of withstanding said thermal treatment without flowing and which preferably retracts under the conditions of said treatment. An advantageous process for manufacturing a windable flexible shaft according to the invention is characterized particularly in that each armoring layer is wound under tension on an anchoring layer made of an elastomeric or thermoplastic material, then covered by wrapping under tension a strip of small thickness constituting a thin hooping and separating layer, the aggregate being subjected to a thermal treatment providing for the embedding of the armoring layer in said anchoring layer by the softening of the latter in combination with the tension applied to the hooping strip, this thermal treatment being carried out while simultaneously applying a longitudinal traction to the flexible shaft, at a temperature ranging between about 100°C and 300° C and under a pressure comprised between 1 kg/cm² and 20 kg/cm², the material selected for forming said hooping and separating layer being able to withstand said thermal treatment without flowing or expanding and preferably contracting under the conditions of this treatment.

The material constituting said hooping and separating layer may advantageously, but not exclusively, be polyethyleneterephtalate and have a thickness ranging, for example, between 90 and 100 microns.

Figure 2:
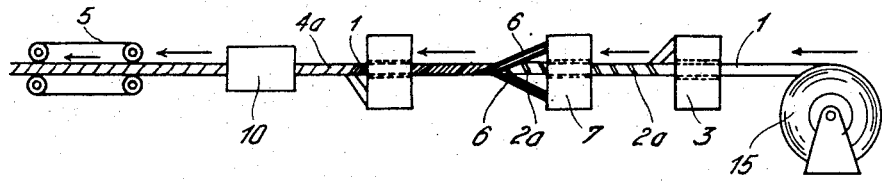
Figure 3A:
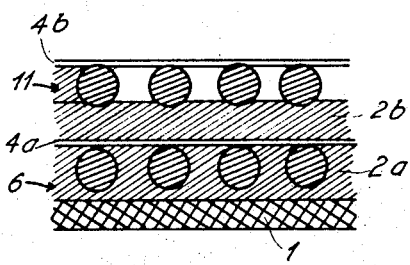
Figure 3B:
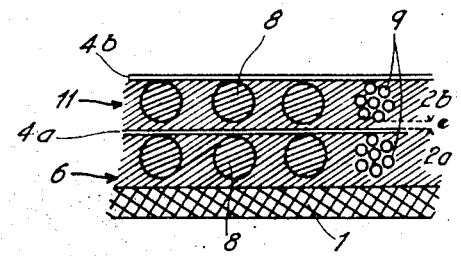
Figure 3:
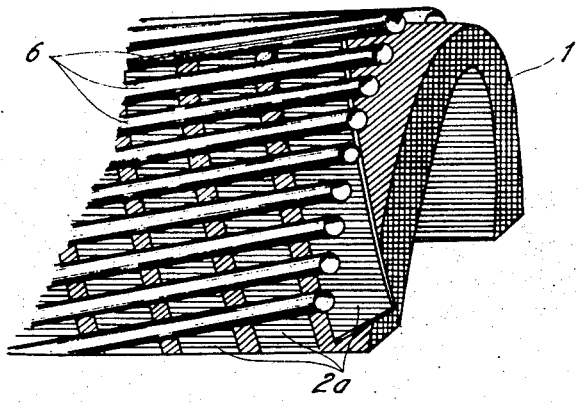

An embodiment of a structure according to the invention and a process for manufacturing the same will be described hereinafter by way of illustration only, with reference to the attached drawings wherein:

FIG. 1 illustrates the structure of a tubular flexible shaft according to the invention, FIG. 2 illustrates the first successive steps of a process for manufacturing this pipe, FIG. 3 is a partial view showing the look of the pipe after the step of laying the first armoring layer has been achieved, FIGS. 3A and 3B partially illustrate by developed cross sections how the pipe looks respectively before the thermal treatment of the second anchoring layer and after this treatment.

In FIG. 1, illustrating an embodiment of a flexible tube according to the invention, 1 designates the core of the pipe, made of an impervious elastic or plastic material selected as a function of the conditions of use of this pipe (pipe for conveying oil or natural gas, drill pipe conveying drill muds or flushing fluids etc ...). One may for instance select a natural or synthetic rubber.

This pipe may optionally be provided with an internal metallic armoring in contact with the conveyed fluid.

This flexible core may also be constituted of a watertight ringed metallic tube of small thickness and small amplitude of undulation, the kind of the metal constituting this core being selected as a function of the conveyed fluid.

The pipe core is covered with an anchoring layer 2a of an elastomeric or thermoplastic material which can be laid around the core in a known manner, by combining the displacement of the pipe in the direction indicated by the arrow by means of drawing devices, such as the ones indicated by 5 in FIG. 2, with wrapping around the pipe core a strip of elastomeric or thermoplastic material, by means of the device 3.

The wrapping of this strip which will constitute the anchoring layer 2a will be preferably performed leaving some spacing between the successive convolutions as it appears in FIG. 3, for reasons to be indicated hereinunder.

The material constituting this anchoring layer may be selected from the non-limitative following list:

hypalon (trade mark for chlorosulfonated polyethylene), chemigum, perbunan or hycar (trade names for a copolymer of butadiene with acrylonitrile), neoprene (trade name of the polychloroprene), natural rubber, butyl rubber (trade name for the copolymer of isobutylene with isoprene), polyurethane, etc...

For special uses requiring a good resistance at high temperatures (up to 250°C) of the flexible pipe it may become necessary to use elastomers such as viton (trade name for the copolymere of fluoro-vinylidene with hexafluoropropylene) fluorated silastene (trade name for the fluorated polysiloxane), the silicones (trade name for the polysiloxanes), Kel-F or teflon (trade names for the copolymer of fluorovinylidene with monochlorotrifluoroethylene), etc ...

It will also be possible to choose a thermoplastic material such as polyethylene, polyvinylchloride, polypropylene, polyamides such as the nylons (trade name for the condensation products of the diacides or of their functional derivatives with diamines or with products of condensation of amino-acides) and the rilsans (trade name for the condensation products of polyalcohols with polyacides or their functional derivatives), etc ...

A first armoring layer 6 is embedded in the anchoring layer 2a.

This armoring layer is constituted (FIG. 3B) either of separate wires 8, or of metallic cables 9, helically wound on the anchoring layer 2a by means of a known type, indicated by the reference numeral 7 in FIG. 2.

The inclination of these metallic wires or cables (flat cables, strands) with respect to the pipe axis is selected as a function of the stresses which they will withstand.

In the illustrated embodiment the layer 6 is one of the two layers of an armoring for withstanding the difference between the internal and external pressures, the other layer of this armoring being indicated by the reference numeral 11 in FIGS. 1, 3A and 3B and being wound in a direction which is opposite that of the layer 6.

The angle of inclination of these two armorings with respect to the pipe axis will, for example, be comprised between 50° and 60°.

The adjacent wires or strands in each armoring layer will be preferably spaced from one another during the winding operation (FIG. 3) for reasons to be given in the following.

The armoring layer 6 is covered with a thin layer 4a (the thickness of which may vary between a few tens microns and some tenths of millimeter, for example) of a flexible material, the nature of which will be defined hereinunder, this layer 4a wound under tension providing the hooping of the armoring layer 6 so as to cause the latter to be regularly embedded into the anchoring layer 2a during the thermal treatment of this layer 2a under the conditions which will be specified in the following. This embedding will prevent the adjacent convolutions of the armoring layer 6 from sliding under one another during the manufacturing of the tube and its utilization.

The thermal treatment will generally be performed by running the pipe through an enclosure 10 in which the temperature ranges from 100°C to 300°C (being most of time close to 150°C, when the anchoring layer 2a is made of a common elastic or thermoplastic material) the running speed of the pipe through this enclosure varying in inverse proportion to the value of the temperature in this enclosure.

The heat quantity required for this thermal treatment providing the embedding of the convolutions of the armoring layer into the anchoring layer 2a will for example be supplied using steam having a pressure between for example 1 kg/cm$^2$ and about 20 kg/cm$^2$ according to the temperature of the thermal treatment.

It will also be possible to supply this heat quantity by means of hot air or by any other suitable means (electric heating heating by infra-red radiation, etc...).

The material constituting the layer 4a will be a material capable of resisting without flowing or expanding as a result of a thermal treatment of the considered type.

The material selected for constituting this layer will preferably be a material which retracts under the conditions of this treatment, so that the latter increases the hooping tension which is given to this layer during the winding thereof, which promotes the embedding of the convolutions of the armoring layer 6 into the straining layer 2a.

The layer 4a, preferably constituted of a strip, will have a thickness which is as reduced as possible, so as, in particular not to exaggeratedly increase the thickness of the pipe, but which is, however, sufficiently thick so that the strip is not torn when it is wound under tension.

Among the materials which may constitute this layer 4a it will be possible to use, advantageously but not exclusively, the polyethyleneterephtalate, particularly the polyester film which is available under the trade marks terphane and mylar.

This polyester exhibits both a good resistance towards temperature and an excellent mechanical resistance, permitting its use in the range of about one kilogram per centimetre of width of the wound strip.

This material not only does not flow or expand under a temperature rise but on the contrary contracts (contraction of the order of 1 to 39 at 150°C) which allows it to be wound under a moderate tension and permits the thermal treatment of each straining layer such as 2a a hooping of the pipe as a result of the retraction of the layers such as 4a which cover the different armoring layers.

It will, however, be possible, for constituting the hooping layers such as 4a, to use other materials which do not flow during a thermal treatment of the considered type, for example cellophane, rayon, cotton. These materials have, however, a lower mechanical resistance than the polyethyleneterephtalate and will require greater thicknesses, which will increase the diameter of the pipe. For example, for a winding tension of a few hundred grams per centimetre of width of the wound strip, a thickness of 0.4 to 0.5 mm will be if the material used to constitute the separating layer 4a is rayon.

It will also be possible to constitute of glass fibers the separating and hooping layer, particularly in the case of a flexible pipe for use at a relatively high temperature (up to 250°C), the material constituting the anchoring layer adjacent to this separating layer being, for example, teflon or silicones which will be heated at a temperature close to 300°C during the anchoring thermal treatment.

If the temperature of this thermal treatment is of the order of 100°C it will also be possible to use nylon or rilsan which would flow at the temperature of 150°, but of course the duration of the thermal treatment will then be increased.

When the core 1 of the pipe is constituted of elastomeric or thermoplastic material it will be advantageous to subject this pipe core to a preliminary thermal treatment, before this core is covered with the anchoring layer 2a so as to prevent the material constituting this core of being deformed by softening or flowing are expanding through the straining layer 2a.

After the thermal treatment performed in 10, the sequence of operations indicated by FIG. 2 is repeated so as to cover the first armoring layer 6 with a second anchoring layer 2b on which is wound the second layer 11 of the pressure resisting armoring of the flexible pipe. The embedding of the layer 1 into this anchoring layer is also achieved by a thermal treatment analogous to the one which has been described, after the armoring layer 1 has been covered with a hooping and separating layer 4b similar to the layer 4a.

The hooping and separating layers 4a and 4b are, for example, constituted of a strip the adjacent convolutions of which overlap one another, on the one hand, in order to prevent the flowing or expansion of the anchoring layer 2b towards the armoring layer 6 during the thermal treatment and, on the other hand, in case this treatment is performed by means of steam, to prevent the penetration of this steam to the armoring layer 6, particularly when the latter includes electric conductors intercalated between the wires or strands.

Furthermore it may be in some cases advantageous to protect the separating layers (4a to 4d) themselves during the successive thermal treatments by winding temporary protecting strip around the external armoring before the thermal treatment, these strips being removed at the outlet of the drawing devices such as 5 (FIG. 2).

In the selected embodiment where the pipe is provided with at least two other armoring layers 12 and 13, the assembly of which constitutes an armoring for withstanding the tractive forces applied to the pipe, there will be carried out in an analogous manner the successive covering of the hooping and separating layer 4b with an anchoring layer 2c. Then a covering will be provided having a layer of wires or strands 12 (which may include electric conductors intercalated between these wires or strands) which will be imbedded into the anchoring layer 2c by a thermal treatment, another hooping and separating layer 4c, another anchoring layer of elastomeric or thermoplastic material 2d and finally a layer 13 of wires or strands which will be embedded into the anchoring layer 2d by a thermal treatment. The layer 13 is in its turn covered with a separating layer 4d with an external coating of elastomer also subjected to a thermal treatment.

According to another embodiment the external coating 14 is made integral with the underlying armoring layer 13 so as to prevent any relative longitudinal movement of the latter, which may occur under some handling operations, particularly reeling or unwinding operations under traction, combined with a contact of the flexible shaft with external elements such as, for example, with the ground or also with drawing or holding devices. This relative movement causes the external coating to fold which may result in the tearing of this coating.

To make the coating 14 integral with the layer 13, the thermal treatment of the anchoring layer 2d may be performed only after having laid the external coating 14, using a hooping layer 4d having a discontinuous structure, so as to allow the anchoring layer 2d to become integral with the coating 14 during this thermal treatment, the anchoring layer 2d and the coating 14 being made of respective materials, the chemical nature of which allows this adhesion and which may be identical.

The layer 4d will then only serve as a hooping layer for the armoring layer 13 which it will not fully separate from the external coating 14 and will, for example, be formed by wrapping a strip or a wire with noncontiguous convolutions, or also by winding overlapping convolutions of a strip having a latticed structure, this last solution providing a more continuous hooping. The material constituting the layer 4d must have the same characteristics as the other hooping layers 2a to 2c, regarding its resistance without expanding or flowing during the thermal treatment.

FIG. 3A illustrates the wrapping of the armoring layer 11 on the anchoring layer 2b, the armoring layer 6 being already in position, embedded in the anchoring layer 2a.

The hooping and separating layer 4a is placed between the layer 6 and the anchoring layer 2b.

In a preferred embodiment of the pipe the layer 11 is wound under a moderate tension which is sufficient to press the wires or strands against the anchoring layer 2b into which they completely penetrate, without, however, embedding them in this anchoring layer since this would require a high winding tension.

The softening of the anchoring layer 2b during the thermal treatment of the latter, in combination with the tension of the layer 11 is sufficient (FIG. 3B) to cause the further penetration and the embedding of the wires or strands constititing this layer into the anchoring layer 2b, the material constituting this layer filling the space which has remained free between the convolutions of the armoring layer. During this thermal treatment it is necessary to permanently keep the flexible pipe under tension (by using for example a drawing device schematically indicated by the reference numeral 5 in FIG. 2 and by simultaneously braking the unwinding of the pipe from the drum 15). This pull exerted on the pipe is for the purpose of preventing that the reduction in the diameter of the armoring layer as a consequence of its penetration into the anchoring layer results in sinuosities in the wires or strands constituting this layer.

There will be provided a sufficient spacing between the successive convolutions of the winding which constitutes each armoring layer, so as to permit the material constituting the anchoring layer to penetrate between these convolutions during the thermal treatment and to prevent the diameter reduction during this treatment from resulting in an excessive reduction of the spacing between the convolutions, which could cause the adjacent convolutions to begin overlapping one another.

The hooping and separating layer 4b covering the layer 11 before the thermal treatment of the anchoring layer 2b is wound around this layer with a hooping tension which is sufficient to cause the regular penetration of the convolutions of the layer 11 into the anchoring layer 2b, thereby transmitting in an uniform a continuous way the external pressure of the fluid (steam or air) conveying the calories during the thermal treatment. However, in order to obtain a sufficient hooping effect and to provide an adequate covering of the tubular core, so as to protect this core against the risks of bursting under the action of an internal overpressure, the spacing of the convolutions of each armoring layer will preferably be at most equal to half the diameter of the wires or strands constituting this layer.

The strip of elastomeric or thermoplastic material constituting each anchoring layer, for example the layer 2a (FIG. 3) has been wound leaving some spacing, for example 5 to 10 mm, between the successive convolutions, as previously indicated, so as to take into consideration the non-negligible thickness of this strip (for example close to 0.4 mm), which practically forbids any overlapping of the successive convolutions so as to avoid any extra-thickness.

This spacing between the convolutions of the strip of elastomeric or thermoplastic convolutions presents no drawback, since it is appearent from FIG. 3 that a satisfactory embedding of the wires or cables constituting the armoring layer 6 in the elastomeric or thermoplastic material, prevents any crossing or overlapping of the adjacent wires or cables of the layer 6, even if there is no continuous filling of the free space between these adjacent wires or cables by the elastomeric or thermoplastic material.

It should be noted, moreover, that during the thermal treatment of the strip 2a, the elastomeric or thermoplastic material flows or expands, thereby reducing the spacing of the convolutions of the anchoring strip (the initial spacing of 5 to 10mm is for example reduced to a value comprised between 0 and 5 mm).

When manufacturing a flexible pipe according to the invention it will be important, by a suitable selection of the thickness of the anchoring layers made of elastomeric or thermoplastic material, such as the layers 2a, 2b and by properly selecting the winding tension of the armoring layer (much as the layer 6 or the layer 11, FIG. 3A) on the corresponding strainning layer, to provide a small thickness "a" (FIG. 3B) (which may be smaller than 1/10mm) of elastomeric or thermoplastic material between, on the one hand, the wires or cables (such as those of the layers 6 and 11) embedded in two adjacent anchoring layers and, on the other hand, one at least of the sides of the hooping and separating layer (such as 4a) located between these two anchoring layers.

This will be allow to prevent any tearing of the separating layer which could result of a pinching of this layer between two wires or cables respectively belonging to two superposed armoring layers, in view of the pressure exerted by the wire or cable of the most external layer, as a result of the winding tension of this layer and of the stresses which may be added to this winding tension during the use of the flexible shaft.

This pressure on the separating layer would, moreover, be much higher, in the same conditions, if one at least of the armoring layers 6 and 11 was constituted at least partly of strands 9 instead of separate wires, as it appears from FIG. 3B, in view of the smaller diameter of the wires constituting these strands.

I claim:

1. Process for manufacturing a windable flexible shaft including the following successively performed operations:
   placing a first anchoring layer of elastomeric or thermoplastic material on a flexible inner core,
   wrapping under slight tension a first armoring layer on the first anchoring layer, said first armoring layer being formed of helical windings of wire or cables,
   covering said first armoring layer by winding under tension a first strip of small thickness constituting a thin hooping and separating layer, and
   subjecting the whole assembly to a first thermal treatment providing for the inlaying of said first armoring layer into said first anchoring layer by softening of the latter combined with said tension applied to said armoring layer, said thermal treatment being performed with simultaneous application of a longitudinal traction to said flexible shaft to prevent the formation of sinuousities in the wires or cables of the armoring layer during reduction in the diameter of the armoring layer as a consequence of penetration of the armoring layer into the anchoring layer during the thermal treatment operation, the material selected for said first strip being capable of withstanding said thermal treatment without flowing and adhering to adjacent structures and of permanently shrinking to increase the hooping action under the conditions of said thermal treatment such that said first strip is prevented from being integrally formed with said first anchoring layer during the thermal treatment operation.

2. Process according to claim 1, wherein said thermal treatment operation consists in applying to said whole assembly and during a predetermined interval of time a temperature comprised between 100°C to 300°C in accordance with the nature of the materials constituting said anchoring layer and said hooping and separating layer.

3. Process according to claim 1, wherein said flexible inner core is a tubular member and is subjected to a preliminary thermal treatment so as to prevent a deformation of said core when said whole assembly is subjected to said thermal treatment.

4. Process according to claim 1, further comprising the following operations following said first thermal treatment operation:
placing a second anchoring layer of elastomeric or thermoplastic material on said first strip,
wrapping under slight tension a second armoring layer on the second anchoring layer, said second anchoring layer being formed of helical windings of wire or cables,
covering said second armoring layer by winding under tension a second strip of small thickness constituting a thin hooping and separating layer, and
subjecting the whole assembly to a second thermal treatment providing for the inlaying of said second armoring layer into said second anchoring layer by softening of the latter combined with said tension applied to said second armoring layer, said second thermal treatment being performed with simultaneous application of a longitudinal traction to said flexible shaft to prevent the formation of sinuousities in the wires or cables of the second armoring layer during reduction in the diameter of the second armoring layer as a consequence of penetration of the second armoring layer into the second anchoring layer during the second thermal treatment operation, the material selected for said second strip being capable of withstanding said thermal treatment without flowing and adhering to adjacent structures and of permanently shrinking to increase the hooping action under the conditions of said second thermal treatment such that said second strip is prevented from being integrally formed with said second anchoring layer during the second thermal treatment operation.

5. Process according to claim 4, wherein said thermal treatments consist in applying to said whole assembly and during predetermined intervals of time a temperature comprised between 100°C. to 300°C. in accordance with the nature of the materials constituting said anchoring layers and said hooping and separating layers.

6. Process according to claim 4, wherein said flexible inner core is a tubular member and is subjected to a preliminary thermal treatment so as to prevent a deformation of said core when said whole assembly is subjected to said first and second thermal treatments.

7. Process according to claim 4, further comprising the following operations following said second thermal treatment:
placing a third anchoring layer of elastomeric or thermoplastic material on said second strip,
wrapping under slight tension a third armoring layer on the third anchoring layer, said third armoring layer being formed of a helical winding of wire or cables,
covering said third armoring layer by winding under tension a third strip of small thickness constituting a thin hooping and separating layer,
covering said third strip with a coating having thermal plastic characteristics comparable to said third anchoring layer, and subjecting the whole assembly to a third thermal treatment providing for the inlaying of said third armoring layer into said third anchoring layer by softening of the latter combined with said tension applied to said third armoring layer, said third thermal treatment being performed with simultaneous application of a longitudinal traction to said flexible shaft to prevent the formation of sinuousities in the wires or cables of the third armoring layer during reduction in the diameter of the third armoring layer as a consequence of penetration of the third armoring layer into the third anchoring layer during the third thermal treatment operation, said third strip being discontinuous over its surface and said coating being flowable during said third thermal treatment whereby said coating is integrally formed with said third anchoring layer during the third thermal treatment.

8. A process for manufacturing a flexible shaft which includes wrapping around a flexible core at least two armoring layers of helical windings each embedded in an elastomeric or plastic material to be cured through a thermal treatment, this process comprising the successive steps of wrapping a first of said armoring layers embedded in said material around the flexible core, wrapping a thin separating layer around said first armoring layer, wrapping the second of said armoring layers embedded in said material around said separating layer, and subjecting the so-constituted assembly to said thermal treatment for curing said elastomeric material, said separating layer being made of a material capable of withstanding said thermal treatment without flowing and adhering to adjacent structures so as to prevent adherence between said two armoring layers during said thermal treatment and substantially without expanding so that said separating layer maintains a permanent hooping action on said first armoring layer during and after said thermal treatment.

9. Process according to claim 1, wherein the covering of said first armoring layer by winding under tension the first strip of small thickness includes positioning said first strip so as to substantially cover all of the outwardly facing surface area of said first armoring layer.

10. Process according to claim 4, wherein the covering of said first armoring layer by winding under tension the first strip of small thickness includes positioning said first strip so as to substantially cover all of the outwardly facing surface area of said first armoring layer and wherein the material of said first strip is capable of withstanding said second thermal treatment without flowing and adhering to adjacent structures, whereby said first armoring layer is prevented from being integrally formed with said second armoring layer during said second thermal treatment operation by said first strip.

11. Process according to claim 7, wherein the covering of said first armoring layer by winding under tension the first strip of small thickness includes positioning said first strip so as to substantially cover all of the outwardly facing surface area of said first armoring layer, wherein the covering of said second armoring layer by winding under tension the second strip of small thickness includes positioning said second strip so as to substantially cover all of the outwardly facing surface area of said second armoring layer, and wherein said first and second strips are capable of withstanding said first, second and third thermal treatments without flowing and adhering to adjacent structures, whereby said first armoring layer is prevented from being integrally formed with said second armoring layer and said second armoring layer is prevented from being integrally formed with said third armoring layer during said thermal operation by said strips.

* * * * *